United States Patent [19]

Heiges

[11] 4,300,083
[45] Nov. 10, 1981

[54] CONSTANT AMPLITUDE CONTROLLER AND METHOD

[75] Inventor: Robert W. Heiges, Erie, Pa.

[73] Assignee: Automation Devices, Inc., Fairview, Pa.

[21] Appl. No.: 21,503

[22] Filed: Mar. 19, 1979

Related U.S. Application Data

[63] Continuation-in-part of Ser. No. 813,081, Jul. 5, 1977, abandoned.

[51] Int. Cl.³ .............................................. G05B 11/00
[52] U.S. Cl. ..................................... 318/686; 318/128
[58] Field of Search ................................ 318/686, 128

[56] References Cited

U.S. PATENT DOCUMENTS

| | | | |
|---|---|---|---|
| 3,331,239 | 6/1967 | Larsen et al. | 318/128 X |
| 3,379,972 | 4/1968 | Foster et al. | 318/686 X |
| 3,626,267 | 12/1971 | Bobbitt | 318/686 X |
| 3,905,188 | 9/1975 | Nishikubo et al. | 318/128 X |

*Primary Examiner*—B. Dobeck
*Attorney, Agent, or Firm*—Jack E. Dominik

[57] ABSTRACT

There is disclosed a constant amplitude controller with feedback control for a vibratory feeder apparatus wherein a controlled rectifier is used to rectify the A.C. line voltage applied to the feeder solenoid and to control the voltage to the feeder solenoid. Triggering of the controlled rectifier is accomplished by a bias control signal which is composed of an A.C. phase shift voltage superpositioned by a variable D.C. bias voltage. Mechanical coupling is provided between the solenoid and a transducer which provides feedback to control logic circuitry. In the control logic circuitry, the signal received from the transducer is compared with a signal received from an operator adjusted potentiometer. In this manner, the desired amplitude of the vibrator apparatus is compared with the actual amplitude of the vibrator apparatus and, if there is a discrepancy, the control logic circuitry modifies the amount of control voltage being transferred by the controlled rectifier.

32 Claims, 16 Drawing Figures

_Fig. 4A_

_Fig. 4F_

_Fig. 4B_

_Fig. 4G_

_Fig. 4C_

_Fig. 4H_

_Fig. 4D_

_Fig. 4I_

_Fig. 4E_

_Fig. 4J_

CONSTANT AMPLITUDE CONTROLLER AND METHOD

CROSS-REFERENCE TO RELATED APPLICATIONS

This is a continuation-in-part of earlier filed co-pending application entitled "CONSTANT AMPLITUDE CONTROLLER" Ser. No. 813,081, filed July 5, 1977 now abandoned.

BACKGROUND OF THE INVENTION

1. Field of the Invention

This invention relates, in general, to vibratory feeders and, in particular, to a control circuit with feedback for use with vibratory feeders for controlling the rate of feed of parts.

2. Description of the Prior Art

The control apparatus for vibrator feeders of the prior art comprises a silicon control rectifier (SCR) to rectify the A.C. line voltage applied to the solenoid of the vibrator feeder and to control the current flow through the feeder solenoid. The SCR blocks the current flow through the feeder solenoid, until a trigger pulse is applied to its gate, at which time the SCR is rendered conductive and remains conductive as long as a sufficient forward current is maintained. The SCR is triggered conductive during a positive half cycle of the current supplied to the feeder solenoid, and remains conductive for the remainder of the positive half cycle. The SCR is cut off for the negative portion of the cycle since it will not conduct reverse current. Triggering of the SCR is controlled by purely a bias control which is a A.C. phase shift voltage superpositioned by a D.C. bias voltage. The control bias voltage applied to the gate of the SCR varies the voltage output of the SCR to the solenoid. Of particular importance is that in the control apparatus of the prior art, this control bias voltage is adjusted by a simple, hand-adjustable, external potentiometer varied by the operator to suit his application.

The drawback of the above-described prior art device is that the output of the SCR is not regulated other than by the external potentiometer, as there is no feedback to supply information as to input line voltage fluctuations and/or output load variations. There has long been recognized a problem concerning wide fluctuations in a fixed amplitude setting of the prior art vibratory apparatus when frequently experienced line and/or load changes occur. Since the present state of the art recognizes only the utilization of a potentiometer to vary the control bias voltage to the SCR, the above-described inherent problems prevent effective use of vibratory apparatuses.

In view of the drawbacks suffered by the prior art vibratory apparatuses, it can readily be seen that there is a need in the part feeding industry for a vibratory apparatus which provides for output load regulation and/or input line regulation to prevent wide amplitude variation with A.C. line and/or output load variation.

SUMMARY

The present invention is directed toward a constant amplitude controller with feedback control for a vibrator feeder, which includes a feeder solenoid for operating the vibrator feeder in a well-known manner. The improved control circuitry for the vibrator feeder comprises a controlled rectifier which is used to rectify the A.C. line voltage applied to the feeder solenoid and to control the voltage to the feeder solenoid. Regulation of the voltage to the solenoid is accomplished by the receipt of the controlled rectifier at its gating terminal of a gating signal. The gating signal includes an A.C. voltage which is phase shifted with respect to the voltage across the controlled rectifier and superpositioned by a variable D.C. bias voltage.

A transducer is mechanically coupled to the vibrator apparatus to provide a transducer signal representatively proportioned to reflect the actual amplitude of the vibratory apparatus. Additionally, operator input is provided for manually setting the desired amplitude for the vibrator apparatus, such desired amplitude being translated by a potentiometer into a reference signal. This reference signal is inputed to control logic circuitry or more specifically, to both an error detector and a summing amplifier. The error detector, which is also coupled to the transducer to receive the transducer signal, sums the transducer signal and the reference signal. Since the two signals are of opposite polarity, one being negative and one being positive, the resultant signal, an error-correct signal, is produced by the error detector and varies with the difference between the reference signal and the transducer signal. The summing amplifier of the control logic circuitry is electrically coupled to the output of the operator input potentiometer to receive the reference signal and electrically coupled to the error detector for receiving the error-correct signal. The summing amplifier, upon summing the reference signal and the error-correct signal, produces as an output, a control signal utilized as the variable D.C. bias voltage for the gate of the controlled rectifier. This control signal, is used to superposition the phase shift voltage to create the gating signal for triggering the control rectifier. With this bias control, it is found that the triggering point of the controlled rectifier can be varied to generate a range of output voltages for the controller rectifier.

In view of the foregoing, it is a primary object of the present invention to provide a constant amplitude controller which is capable of output load regulation and input line regulation so as to prevent amplitude variation as A.C. line and/or output load varies.

Another object of the present invention is to provide an improved solid state control circuit for use with vibrator feeders for controlling the rate of feed thereof, over a wide range.

Still another object of the present invention is to provide an improved control circuit of the above type using a silicon control rectifier with a feedback system for controlling the triggering or turn-on point of the silicon control rectifier over a range of zero° to 180°.

Another object is to provide a constant amplitude controller which is transient protected.

Another object is to provide a constant amplitude controller of the above type which can be used with existing controllers, and which does not place design limitations on future solenoid designs.

Other objects of the invention will in part be obvious and will in part appear hereinafter.

DESCRIPTION OF THE DRAWINGS

Further objects and advantages of the present invention will become apparent as the following description proceeds, taken in conjunction with the accompanying drawings in which:

FIG. 2 is a detailed block diagram of the constant amplitude controller. FIG. 2 is broken up into FIGS. 2a and 2b due to the detailed block diagram being too large to fit on one sheet of drawings and therefore FIG. 2 is continued from the right side of FIG. 2a to the left side of FIG. 2b.

FIG. 3, is a circuit schematic of the constant amplitude controller. FIG. 3, due to its size being such that it can not be situated on one sheet of drawings, is continued on three sheets and labeled FIGS. 3a, 3b, and 3c. FIG. 3 a continues from its right side to the left side of FIG. 3b, while FIG. 3b continues from its right side to the left side of FIG. 3c.

FIG. 4, shows various illustrative waveforms of the voltage at various points in the control circuit. FIG. 4 is broken up into four segments 4a–4j, each segment representing the positioning of the waveform at various points in the control circuits and under differing conditions.

DETAILED DESCRIPTION OF THE PREFERRED EMBODIMENT

The present invention discloses a constant amplitude controller, generally indicated as 8, which comprises a solid-state regulator used for the purpose of varying and controlling the amplitude of a vibrator parts feeder, the details of such feeder not being shown herein. Although the invention disclosed herein can be utilized with any model of vibrator parts feeder, the specific structure as disclosed herein is particularly designed to be used with a Model 25 feeder with an extra-heavy duty special coil. This particular unit, which is commercially available, can accommodate a 30-inch bowl. Furthermore, this feeder unit can handle up to approximately 125 pounds of parts, and it is capable of driving these parts at an amplitude continuously varying from 0 to 0.075 of an inch. With the use of the constant amplitude controller 8 of the present invention, regulation of this unit is such that the amplitude should not vary more than ±0.005 of an inch from a minimum load (approximately 25 pounds) to a maximum load. This variation in amplitude regulation is also held while the A-C input voltage varies between 105 volts A-C and 140 volts A-C.

Figure 1:
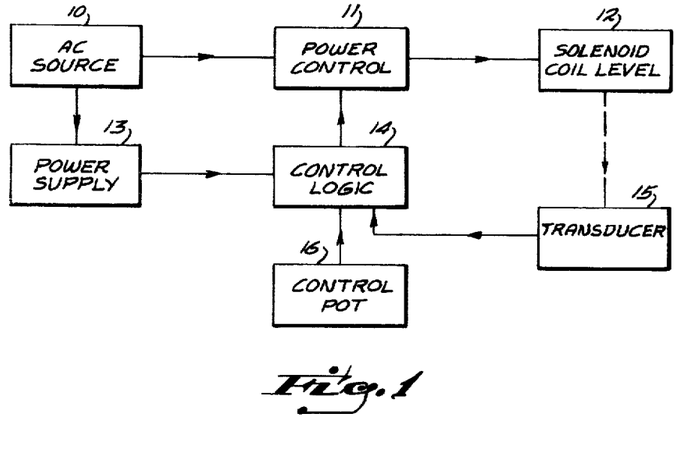
FIG. 1 is a general block diagram of the constant amplitude controller.

FIG. 1 shows a general block diagram of the constant amplitude controller 8. The A-C power for the constant amplitude controller 8 enters the controller, as represented by block 10, passes through a power control means 11, to reach the coil load or feeder solenoid 12. Mechanical coupling is provided between the coil load 12 and a transducer means 15. In addition to being coupled to the load, the transducer means 15 provides feedback to a control logic means 14. In this manner, a feedback loop is created consisting of the mechanical coupling between the coil load 12 and the transducer means 15, through the control logic means 14, through the power control means 14, and back to the coil load 12. It is through this feedback loop that control regulation becomes possible. The control logic means 14 receives its control drive voltage from power supply 13. Control is provided by operator input means comprising a control potentiometer 16 which is coupled to the logic control means 14.

As an example of the operation of the above described system, if the control potentiometer means 16 is set by the user to give a predetermined output load amplitude, and the resulting amplitude varies from the desired, predetermined amplitude, a signal is provided by the transducer means 15 to the control logic means 14. The control logic means 14, in response to this electrical signal modifies the amount of control voltage being transmitted to the power control means 11. In the case where the amplitude has decreased below desirable levels, the control logic means 14 would increase the amount of control voltage to the power control means 11, which in turn increases the voltage being received by the coil load from the power control means 11. This increase in transmitted voltage to the coil load increases the amplitude back to its predetermined desired level.

Ideally, the control potentiometer means 16 allows for the adjustment of the maximum limit of the amplitude of the vibrator parts feeder so as to vary the same from 0 to 10% of the maximum.

The input power for the constant amplitude controller 8 is preferably 120 volts A-C, nominal, at 60 cycles, but other voltages, such as 240 volts A-C input and/or lower or higher load current models could be utilized with the present invention. The output of the constant amplitude controller 8 is a phase-controlled, rectified DC, and with the preferred input of 120 volts A-C, the output voltage has a range infinitely adjustable from approximately 40 volts to the line maximum. Preferably, the unit is inherently transient protected, and the unit is not effected by over-voltage.

Figure 2A:
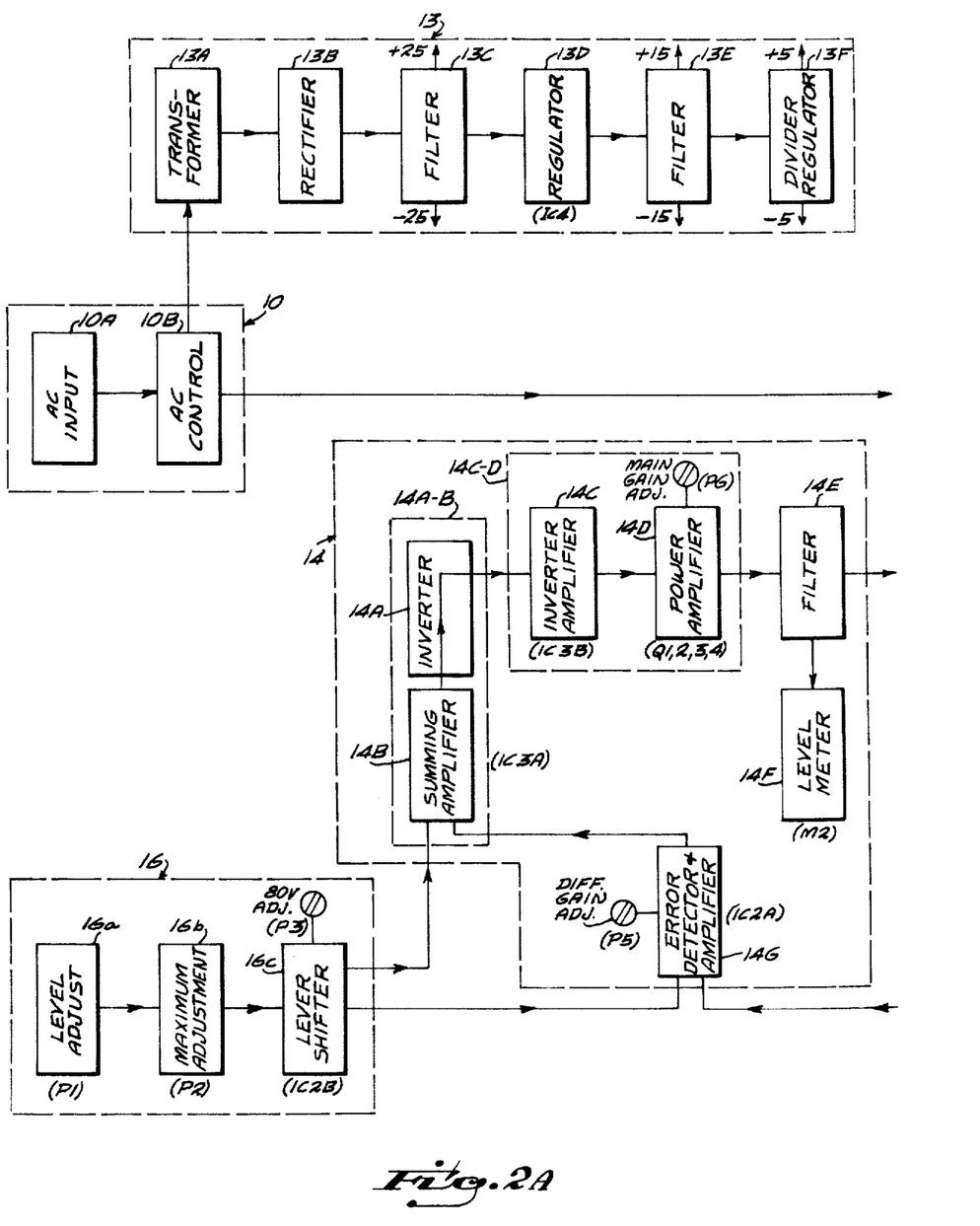
Figure 2B:
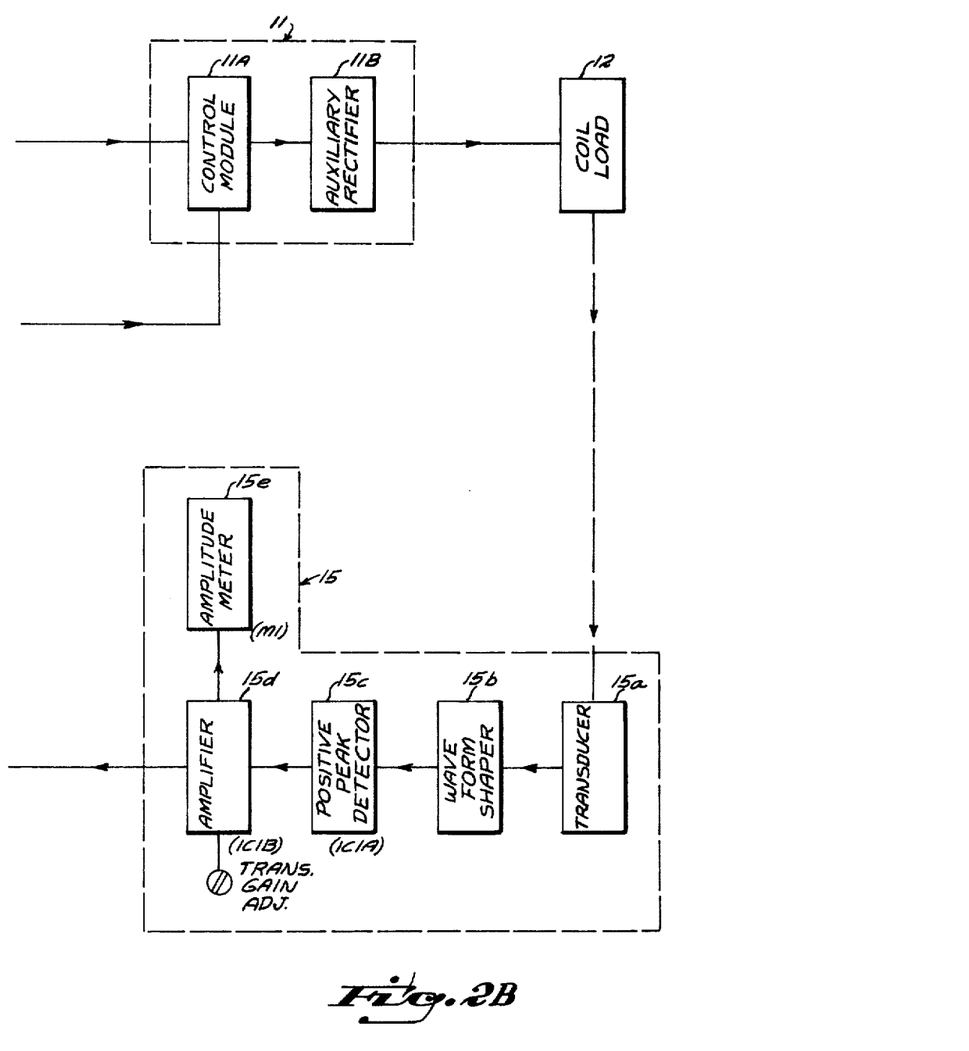
Figure 3A:
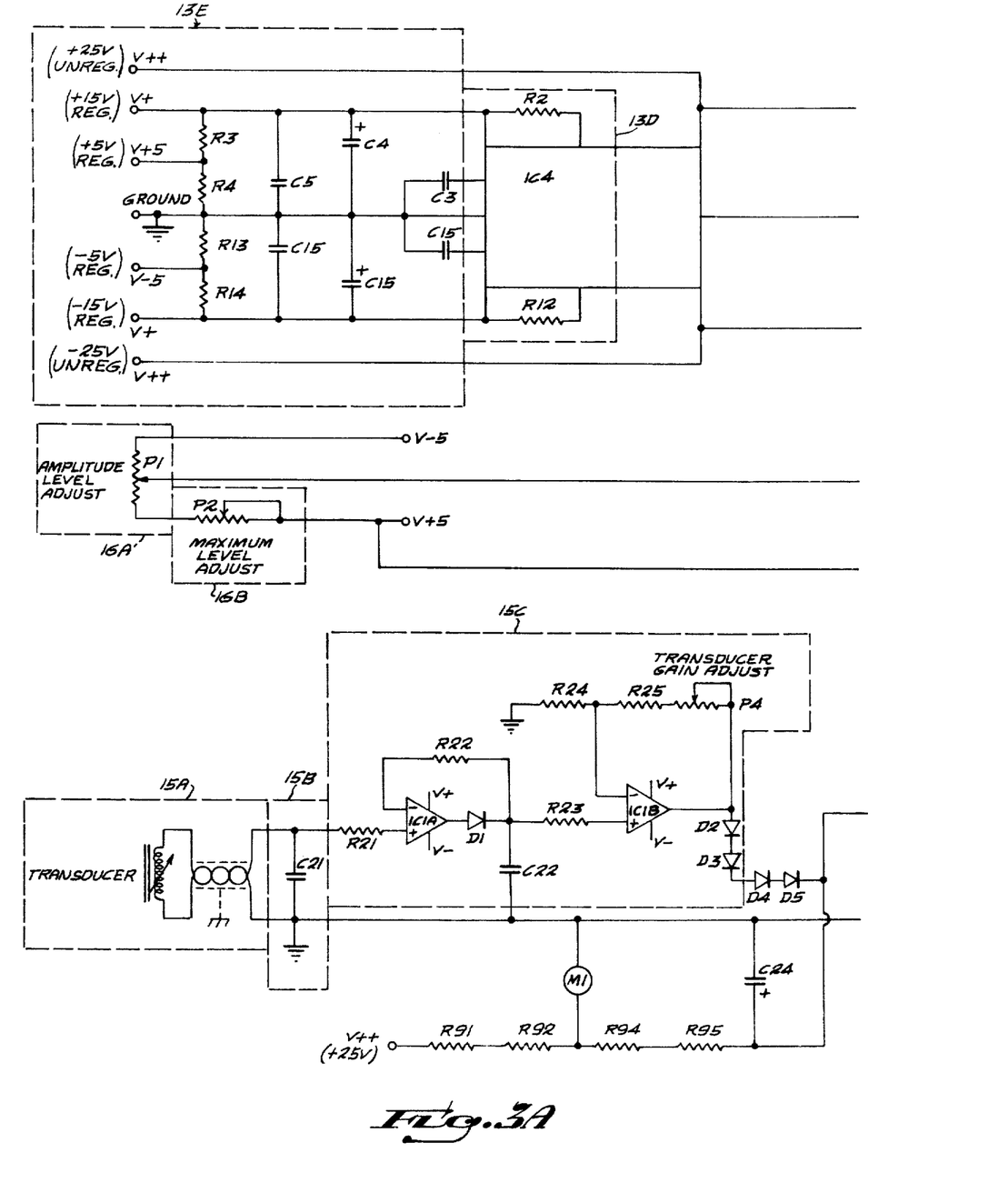
Figure 3C:
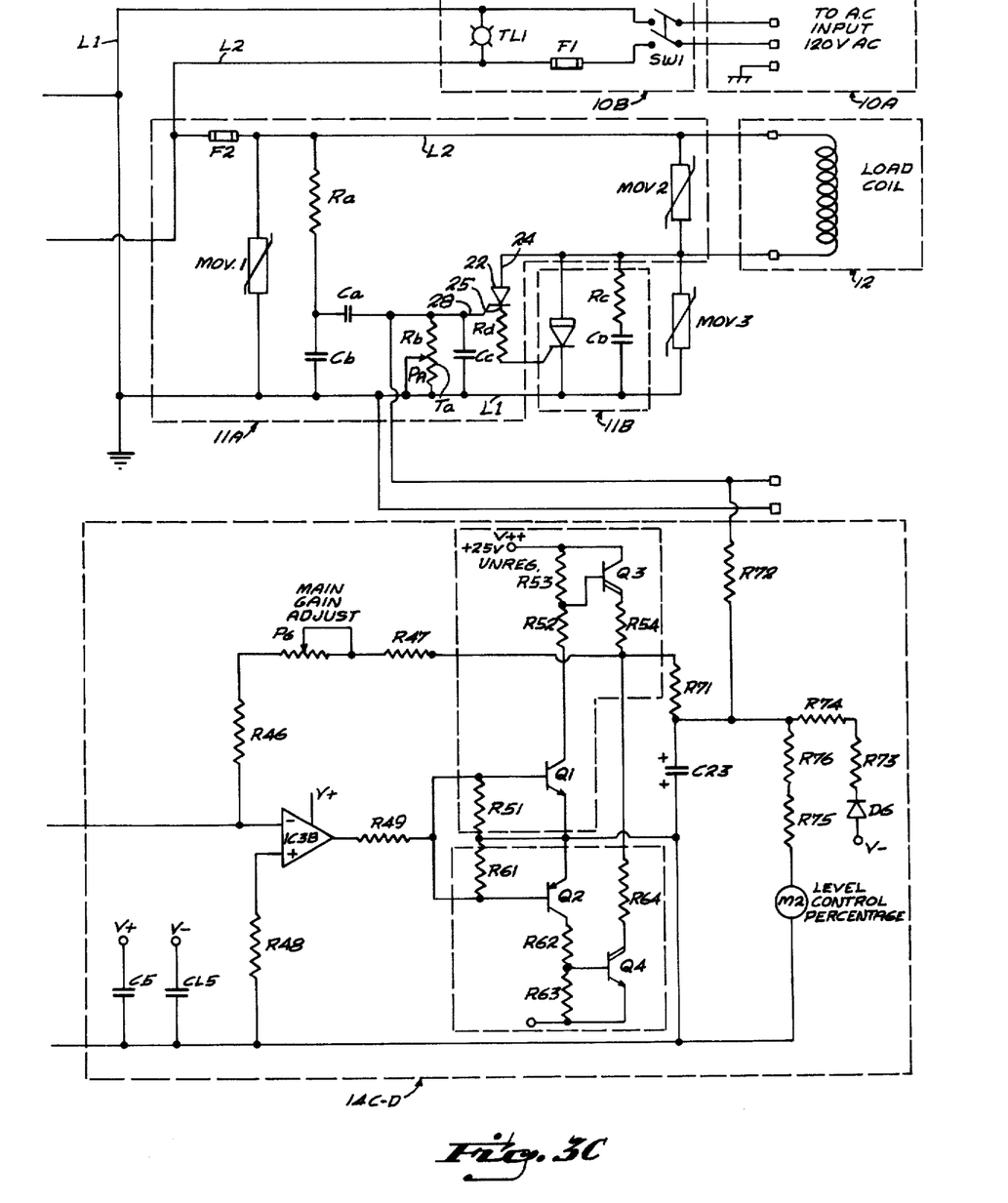

The structural details of the specific device will be more evident upon a detailed description of the operation of the constant amplitude controller 8 as provided in the description of FIGS. 2 and 3. FIG. 2 is a more detailed block diagram of the constant amplitude controller 8, while FIG. 3 is a circuit schematic of the constant amplitude controller 8.

In the detailed block diagram of FIG. 2, it can be seen that the A-C source block 10 comprises an A-C input 10A and an A-C control 10B which is electrically coupled to the A-C input 10A. As can be seen from FIG. 3C, the A-C control 10B comprises a switch SW1, fuse F1, and indicator light IL1. Ideally the fuel F1 is a 15 amp fuse.

Power control means 11 which is electrically coupled to A-C control terminal board 10B comprises control module 11A and auxilliary silicon control rectifier (SCR) 11B. The control module 11A is a controlled rectifier, or more specifically a simple phase-shift-controlled SCR type of regulator labeled 22 in the drawings. The preferred embodiment of the constant amplitude controller 8 was specifically designed to be adapted to existing control modules 11A as they already exist upon many commercial parts feeder systems.

Referring to FIG. 1, the power control means 11, for controlling the operation of the feeder solenoid 12 and hence the vibratory feeder includes a silicon control rectifier (SCR) 22 and two circuits which interact with each other. The first circuit supplies a non-varying phase-shifted A-C voltage to be applied to the gate 28 of the SCR 22. Turning to FIG. 3, this circuit comprises resistor Ra, capacitor Cb across the A-C line feeding of lines L1 and L2 and capacitor Ca which is connected directly to the gate 28 of the SCR 22. Ideally, the magnitude and phase-shift of this applied voltage (gate to cathode) is approximately 8 Volts AC (with the gate open-circuited) at approximately 45 degrees phase shiftAs shown in FIG. 3, the second circuit provides a variable D.C. bias control voltage to be superimposed over the A.C. phase shift voltage. The second circuit comprises potentiometer Pa, potentiometer resistor Rb, capacitor Cc and resistor Rd. The potentiometer Pa is connected across the gate 28 and cathode 25 of SCR 22 and its divider tap is labeled Ta. This Point Ta can supply an aiding or opposing D-C bias control voltage to the phase-shifted A-C from the previously-described first circuit. This D-C bias level is applied to the SCR gate 28 through the current-limiting Rd resistor. Potentiometer Pa is a simple, hand-adjustable, potentiometer to be varied by the operator to suit his application. A variable D.C. voltage is inputted to the potentiometer Pa, the variance of which is dependent upon a feedback system.

The anode 24 and the cathode 25 of SCR 22 are connected in series with the source of power 10 and the feeder solenoid 12, so as to rectify the A-C line voltage from the source of power 10 and to conduct forward current flow from the line L1 to the Line L2. In other words, when the line L1 is positive and the SCR 22 is conductive, current will flow from the source of power 10, through the feeder solenoid 12 and the SCR 22 cuts off the current flow through the feeder solenoid 12 during the negative half cycle of the supply current, since it will not conduct reverse current.

The SCR 22 rectifies the A-C line voltage applied to the solenoid 12 of the vibrating feeder and also controls the current flow and voltage to the feeder solenoid 12. The SCR 22 blocks the current flow through the feeder solenoid 12, until a control signal in the form of a trigger pulse is applied to its gate 28, at which time the SCR 22 is rendered conductive and remains conductive as long as a sufficient forward current is maintained. As indicated above, the triggering of the SCR 22 is controlled by purely a bias control which is a phase shift voltage superpositioned by a D-C bias voltage. Ideally this bias control permits the triggering point of the SCR 22 to be controlled, or varied, in a linear fashion over a range, such as from 0° to 180°.

Figure 4A:
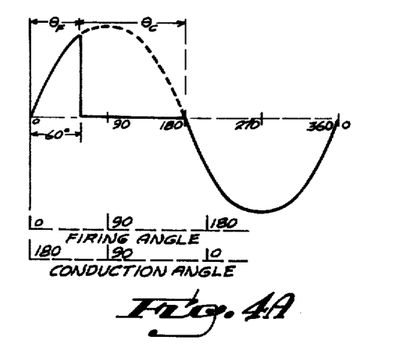
FIG. 4(a) shows the voltage across the SCR.

The operation of SCR is well known, in the prior art, but for the purposes of explanation, a detailed discussion will be presented hereinafter using illustrative examples. An example of what a typical A.C. voltage wave form across the SCR 22 might look like is shown in FIG. 4a. Note that the wave form can be examined in approximately three sections: (a) That from 0° to 60°, (b) That from 60° to 180°, and (c) That from 180° to 360°. In the first section of the wave form to be examined it can be seen that the A.C. voltage wave form follows that which would be expected of an ordinary A.C. sine wave. It follows the sine wave pattern to approximately 60° in this typical example. At the 60° point the voltage drops to the zero voltage axis line. The angular distance as measured from the left hand zero degree axis point to the point at which the A.C. voltage drops to zero is called the firing angle. In this typical example the firing angle is approximately 60°. The second section of the A.C. wave form is represented by a voltage graph line along the zero voltage axis. This zero voltage goes from approximately 60° to 180°. It is during this time that the SCR is conducting. As is expected the voltage across the SCR when it is conducting is zero as is depicted. The conduction angle is the amount of electrical degree that the SCR 22 is conductive and is the electrical degree reciprocal of the firing angle. Mathematically the conduction angle is equal to 180° minus the firing angle. Refer to the illustration at the bottom of FIG. 4a for a sketch outlining the difference between the firing and conduction angles. The third section of the A.C. wave form on FIG. 4a shows where the A.C. voltage drops below zero. It is not possible for the SCR to conduct when it is reversed bias, therefore all the voltage appears across the SCR 22 and SCR 22 current flows.

Figure 4B:
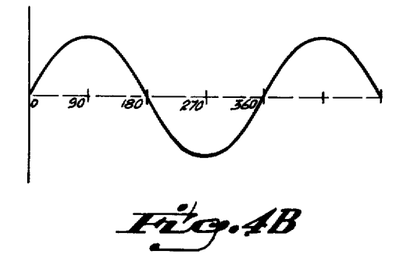
FIG. 4(b) shows an ordinary sine wave.
Figure 4C:
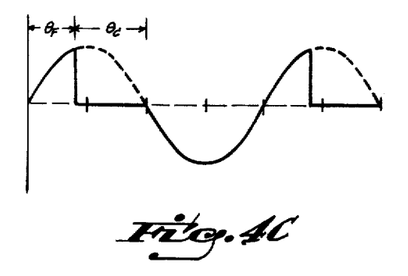
FIG. 4(c) shows the wave form across the SCR with the firing of the SCR, having been initiated fairly early in the cycle.
Figure 4D:
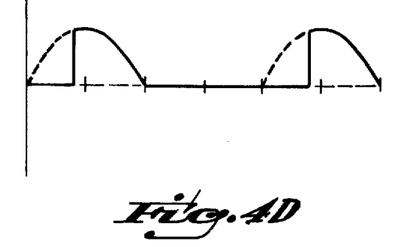
FIG. 4(d) shows the wave form across the load for the firing which occurred in FIG. 4(c).
Figure 4E:
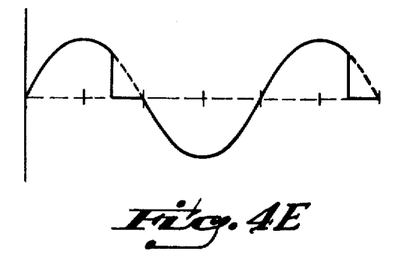
FIG. 4(e) shows the wave form across the SCR, where there is less of a firing angle than in FIG. 4(c).
Figure 4F:
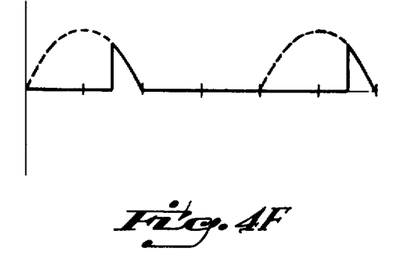
FIG. 4(f) shows the wave form across the load for the firing in FIG. 4(e).

In our typical example presented here it has been suggested that the firing angle is 60°. In actuality the firing angle could be anything from 0° to approximately 180°. This changing of the firing angle changes the percentage of voltage applied to the load 12 and thus is an effective form of power control. Referring to FIGS. 4b through 4f, this set of figures shows how varying the firing angle can vary the amount of voltage across the SCR 22 and across the load 12. FIG. 4b is simply an ordinary sine wave as might be encountered across the input to the power control means 11. FIG. 4c is the wave form across the SCR 22. Notice that the SCR 22 has been turned on at some point in the positive A.C. cycle and the voltage across the SCR 22 has gone to zero from the point at which it's been turned on to the approximately 180° point. FIG. 4d shows the voltage applied to the load. Note that the voltage which is applied to the load is applied after the SCR 22 has been turned on. FIGS. 4c and 4d are a wave form set and if the voltage wave form across the SCR 22 were added to the voltage wave form across the load the result would be a continuous sine wave as shown in FIG. 4b. The wave form pair as shown in FIGS. 4e and 4f represent the same as shown in FIGS. 4c and 4d, except that in the FIGS. 4e and 4f, the firing angle has been retarded to approximately 150°. This results in a lower percentage of the available A.C. being applied to the load 12. This lessened amount of applied A.C. is shown in FIG. 4f.

Figure 4G:
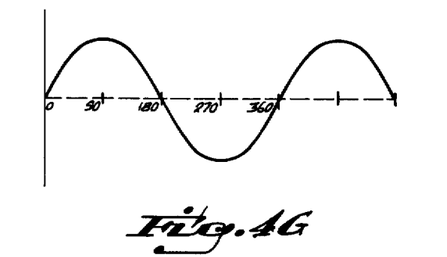
FIG. 4(g) shows the wave form of the AC input voltage.
Figure 4H:
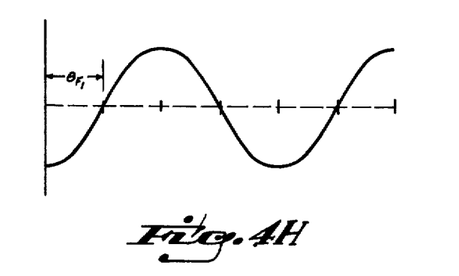
FIG. 4(h) shows the wave form at the output of an AC phase shifting network.
Figure 4I:
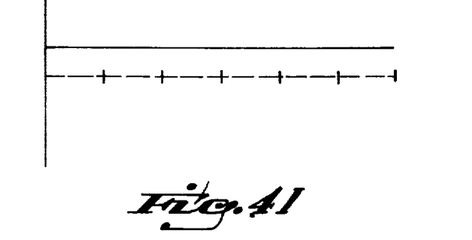
FIG. 4(i) shows the wave form at the output of a DC level shifting network.
Figure 4J:
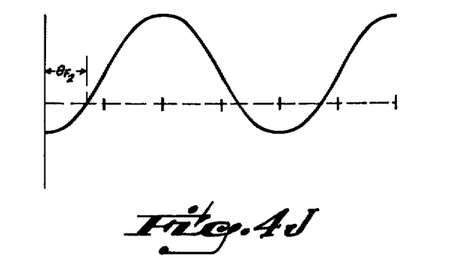
FIG. 4(j) shows the combination of the wave forms of FIGS. 4(h) and 4(i).
Figure 5B:
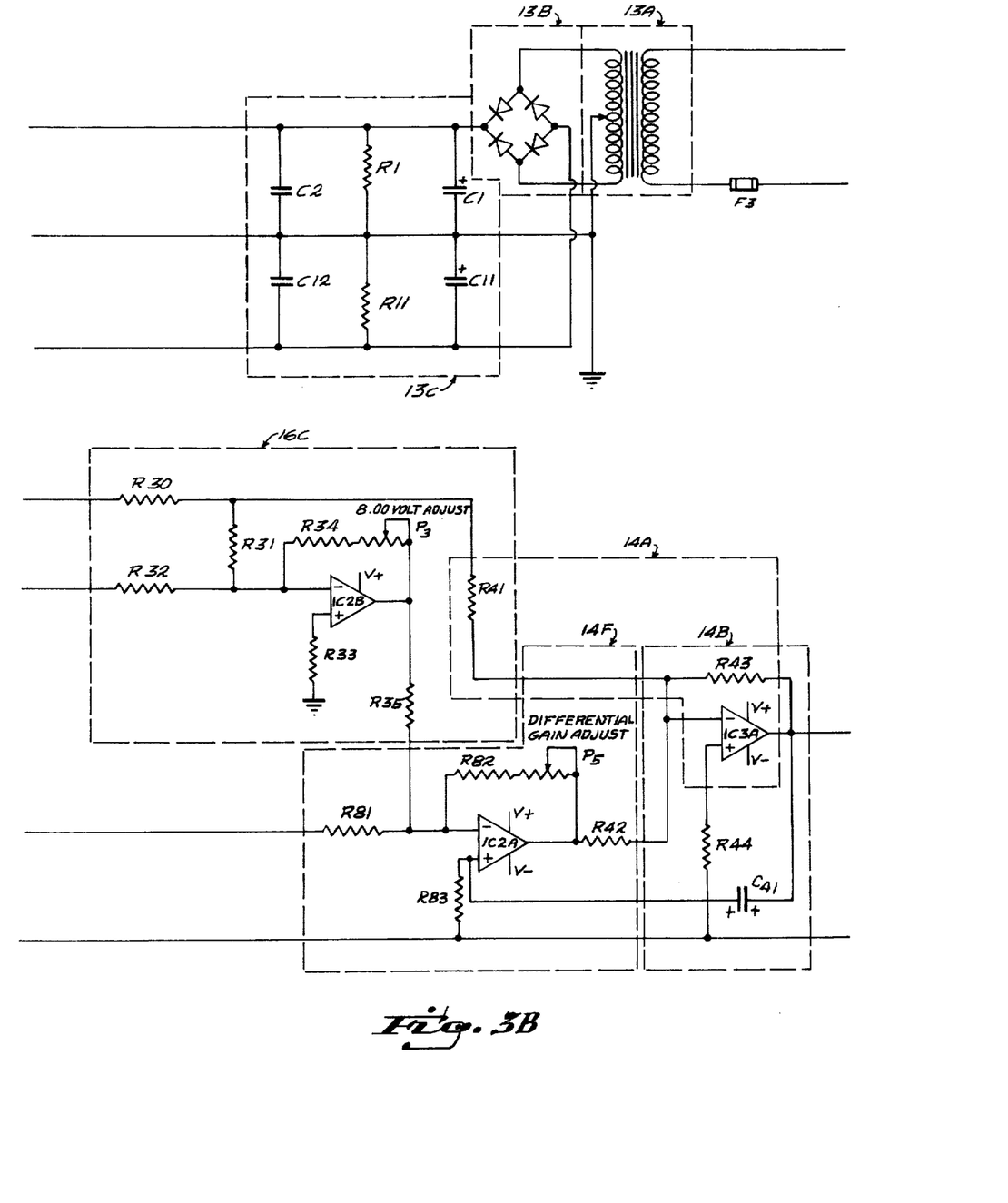

As already explained, in the case of an A.C. wave form the SCR 22 conducts during those parts of the positive wave form in which a gate voltage was supplied. Once turned on then the SCR 22 would remain conductive for the remainder of the positive half cycle. It would not conduct under any circumstances during the negative part of the cycle. Turning now to FIG. 4g, it can be seen that this is the wave form at the A.C. input. This wave form is an ordinary sine wave starting at zero degrees going through one full cycle to 360°. This wave form would reach maximum positive at 90° and maximum negative at 270°. This wave form would then repeat another full cycle from zero to 360°. FIG. 4h is a similar type of a wave form (sine wave) but it has been shifted to the right by approximately 90°. This wave form could be representative of the A.C. phase shifted voltage which is the output of the A.C. phase shifter of control module 11a, to be described hereinafter. It is important to note that if this wave form were to be used for the gate voltage, the SCR 22 would be triggered at approximately the 90° point. This would supply about half the A.C. power to the load 12. FIG. 4i is an illustrative constant level D.C. voltage. This wave form could vary from a plus value to a negative value. FIG. 4j shows what could be the result in our illustrative example if the wave form in FIG. 4h and the wave form in FIG. 4i are combined. In FIG. 4j, note first that the maximum value of the positive half of the A.C. wave has been increased and there has been a corresponding decrease in the maximum negative value of this wave form. This is because the A.C. wave form of 4h has been moved upward by the amount of the D.C. wave form in 4i. Also note that the basic integrity of this wave form has been maintained the maximum points are still in line with each other. The second important feature to note in the wave form of 4j is that although the maximum and minimum points occur at the same time as the wave form shown in 4h, the firing angle has changed. The firing angle as designated by $O_F2$ has moved back to a smaller angle than $O_F1$. This has been accomplished by shifting the D.C. level so that the zero crossing point occurs earlier on the degree scale. If the voltage in 4j were now applied to the SCR 22 as before, the SCR 22 would be triggered much earlier in the cycle, therefore applying more power to the load 12. Conversely if a negative D.C. voltage were applied to the SCR 22 it would be triggered late in the cycle, therefore applying a proportionately smaller amount of voltage to the load 12. Thus it should be evident that by controlling the amount of D.C. level, the firing angle of the SCR 22 can be changed, forming an effective way of phase controlling the SCR circuit. This phase control can be extended to give a firing angle anywhere in the range from zero to 180°. Note that an important side benefit of this system is that a linearly changing D.C. voltage produces a linearly changing A.C. phase shift. Preferable value of the respective voltages in this case are 8 volts approximately R.M.S. and plus 20 through minus 20 D.C. These voltage ranges will give complete zero to 180° phase control.

The circuit schematic of FIG. 3B shows that the input A-C goes to transformer 13A and to the control module 11A. As can be seen in FIG. 2, the A-C input 10, the power control means 11, and the coil load 12 make up a power loop.

The detailed block diagram of FIG. 2 shows six blocks making up the power supply means 13. More specifically, power supply means 13 includes transformer 13A, rectifier 13B, filter 13C, regulator 13D, filter 13E, and divider regulator 13F, all shown in series relationship respectively in FIG. 2. As shown in FIG. 3B, the filter 13C includes capacitors C1, C2, C11, C12 and resistors R1 and R2. The reason for numbering as is shown on the schematic is so that components serving similar but opposite functions will have somewhat similar numbers. For instance, C1 filters the power supply positive voltage; C11 filters the power supply negative voltage. Similar but opposite functions are served by the components in the number sequence 1 through 10 and 11 through 20.

Regulator 13D includes integrated circuit IC4. Integrated circuit IC4 is a complete dual-voltage, current limited, regulated power supply on one 14-pin chip. It can take an input voltage of from 18 to 35 volts ±DC and give an output of a regulated 15.0 volts ±DC. This regulated voltage will be maintained within one-tenth of one percent for a 10% input AC change from 0 to 100 milliamps load. This chip is an LM1468 and is different from the other three chips, all of which are LM747's.

The regulated voltage from this IC4 is fed into filter 13E, which comprises capacitors C4, C5, C14, and C15. Capacitors C3 and C13 are compensating capacitors for the integrated circuit. Divider regulator 13F is a ±5 volt regulator, achieved by a voltage divider across the ±15 volts. The ±5 volt regulator is resistors R3 and R4, and the −5 volt regulator is resistors R13 and R14. Thus, the power supply means 13 provides the necessary control voltages of ±25 volts DC unregulated, ±15 volts DC regulated, ±5 volts DC regulated and ground return.

Referring to FIGS. 2 and 3 the necessary control logic to achieve the required regulation is shown. Included therein is control potentiometer 16, as shown in FIG. 2, and as depicted in FIG. 3, control potentiometer 16 includes amplitude level adjust potentiometer 16A shown on the schematic of FIG. 3, as P1. This is one of two customer-adjustable potentiometers and is the main one the operator varies. The maximum level adjust potentiometer 16B is the other operator-accessable potentiometer, labeled as P2 on the schematic.

Referring to FIG. 2, the signal from these two potentiometers 16A and 16B is fed into a level shifter 16C. Turning to FIG. 3, it can be seen that this lever shifter 16C is composed of resistors R30, R31, R32, R33, R34, R35, operational amplifier IC2B and −8 volt adjust potentiometer P3. Operational amplifier IC2B is another integrated circuit and is part of a single 14-pin chip (as the other two LM747's) which contains two complete and independent low-power, selectable-gain amplifiers. These amplifiers will be shown on the schematic and block diagrams as A and B parts (for example, IC2B refers to the B half of Integrated Circuit 2—integrated circuits in this device have been number 1-2-3. The function of amplifier IC2B is to shift the voltage level of the amplitude level adjust potentiometer 16A so that the output of this operational-amplifier IC2B is 0 to −8 volts. At maximum output, the −8 volt adjust potentiometer P3 should be adjusted for −8 volts. The level of this signal from the amplitude level adjust potentiometer 16A has been shifted from −5 to +5 volts to a level of 0 to −8 volts. The signal from level shifter 16C is sent to the summing amplifier 14B in the logic control means 14, unmodified and level shifted. Also, without its level shifted, the signal is sent to the error detector and amplifier 14C of control logic means 14.

The transducer means 15, as shown in FIG. 2, is further broken down in FIG. 2 to transducer 15A, wave form shaper 15B, positive peak detector 15C, amplifier 15D, and amplitude meter 15E. The wave form shaper 15B includes capacitor C21. Resistors R21 and R22, diode D1, capacitor C22, and operational amplifier IC1A form the positive peak detector 15C. This signal is fed to the amplifier 15D. This amplifier 15D comprises resistors R23, R24, R25, and potentiometer P4, and diodes D2, D3, D4, D5 and operational amplifier IC1B. The function of transducer means 15 is to receive, condition and amplify and adjust the value of the transducer signal. The signals at capacitor C22, with reference to circuit ground, will be the peak value of the positive half of the A-C signal produced by the vibrating, feeder-mounted transducer 15A. This signal at this point will have been slightly stabilized and shaped. The signal is then amplified by the operational amplifier IC1B. The level of amplification will depend upon the characteristics of the feeder and the mounting of the transducer. An additional part of this circuitry is the meter 15E. The signal from the output of operational amplifier IC1B is further filtered and applied to the meter 15E through a voltage-reducing network. A second voltage is also applied to this network which is a function of the A-C line input. The purpose of this circuit is to give a meter reading which is proportional to the amplitude.

As shown in FIG. 2, control logic means 14 comprises error detector and amplifier 14G, inverter 14A, summing means comprising summing amplifier 14B, inverter amplifier 14C, power amplifier 14D, filter 14E and level meter 14F. In referring to FIGS. 2 and 3, error detector amplifier 14G includes amplifier IC2A, summing amplifier 14B includes amplifier IC3A, and inverting amplifier 14C includes amplifier IC3B. Consider what happens when a signal comes down only from the amplitude level adjust potentiometer 16A through resistor R30 to integrated circuit IC3A. This signal would be one which could vary from $-5$ volts DC to $+5$ volts DC. Integrated circuit IC3A, in conjunction with resistors R41 and R43, is a simple voltage inverter 14A. The signal from integrated circuit IC3A is fed into a complex hybrid amplifier 14C-D consisting of integrated circuit IC3B and transistors Q1 through Q4. This complex hybrid amplifier 14C-D includes the high voltage ($\pm 25$ volts) and high power amplifier 14D and the inverting amplifier 14C. The gain of this amplifier 14C-D is such that this signal is amplified approximately $-4.5$ times. Capacitor C-42, shown in FIG. 3C, connected in series with the output of the summing amplifier and the imput of the hybrid complex amplifier, provides integrating feedback and introduces a time-constant produced by itself and the resistor R45. A smoother, ramp-light change in the final power amplifier 14D output voltage is thus obtained. At this point we can now look at the combination of IC3A and the hybrid amplifier of IC3B and the transistor pairs as a single non-inverting high-power high-voltage adjustable gain amplifier 14A-D. It should be noted that in amplifier 14A-D there are two signal inversions. In circuit design it is imperative that one not only be aware of design rules but must also be aware of the technical rules concerning parts availability. If one were to look at the circuit doing simply a Boolean Algebra analysis and following DeMorgan's rules it would be true that it appears that two inversions do yield one non-inversion. However, there are in some circuit applications characteristics of an inverting amplifier that make it preferable to a non-inverting amplifier. There are also other factors to be considered such as availability and constructability of inverting versus non-inverting amplifiers. All of the above factors were taken into consideration in the design of this amplifier 14A-D.

Taking into account the above, it can be seen that integrated circuit IC3A is a simple inverting amplifier 14A, with a gain of $-1$, and the complex hybrid amplifier 14C-D has a gain of $-4.5$; therefore, any signal fed into this network is amplified $+4.5$ times ($-1 \times -4.5 = +4.5$). Thus, the amplitude level control potentiometer 16A that has a range of $\pm 5$ volts which can control an output of $\pm 22.5$ volts. The $\pm 22.5$ volts is filtered by the nonpolarized capacitor C23 and fed to the current-limiting resistor R72 into the control module 11A through connection point Tb.

As shown in FIG. 3, complex hybrid amplifier 14C-D further comprises positive and negative amplifiers 18 and 19 respectively. Transistors Q1 and Q3, with Resistors R51, R52, R53 and R54, form the positive amplifier 18. The complementary negative amplifier 19 is formed in the negative half by transistors Q2, Q4, R61, R62, R63 and R64. These amplifiers are driven by the operational-amplifier IC3 and resistors R45, R46, R47, R48 and main gain adjust potentiometer P6. This part of the circuit also drives a level control percentage meter M2. This meter M2 is driven through resistors R75 and R76 and with a zero level compensation voltage applied through R73 and R74.

A further explanation of the hybrid complex amplifier 14C-D is as follows. If a negative signal is applied to amplifier IC3B, a positive signal will be applied through resistor R49, biasing on transistor Q1. Transistor Q1 then turns on transistor Q3 through resistor R52. Resistors R51 and R53 provide base-emitter stabilization. When transistor Q3 turns on, it connects the V++ ($+25$ volts unregulated) supply to the filter capacitor C23 through resistor R54. Thus, a positive voltage starts to build on capacitor C23. Conversely, if a positive voltage were applied to amplifier IC3B, the complement of the above would occur.

Turning back to the error dectector and amplifier 14G having summing amplifier IC2A, amplifier IC2A operates as a summing amplifier which sums the negative signal of the level shifter 16C, or more specifically of amplifier IC2B and the positive signal from the transducer 15, or more specifically the wave-shaper amplifiers IC1A and IC1B. These signals are summed on a 1 to 1 ratio through resistors R35 and R81, respectively. The gain of this amplifier is set by those resistors and resistor R82 and potentiometer P5, the differential gain adjust potentiometer. The resulting non-canceled difference between this negative and positive signal is amplified by this operational amplifier IC2A.

The signal from amplifier IC2B represents, on a scale from 0 to $-8$, what the operator has set as the desired amplitude level. The signal from the transducer amplifiers IC1A and IC1B, represents, on a scale from 0 to $+8$, what is the amplitude of the bowl. If these two signals are equal but opposite, they will totally cancel, and no signal will be fed through and amplified by amplifier IC2A to amplifier IC3A.

Integrated circuit IC3A, labeled 14A-B on FIG. 3, was previously described as including simply a voltage inverter 14A. It is a voltage inverter, but it also includes the summing amplifier 14B. Integrated circuit IC3A is a summing amplifier, on a 1 to 1 ratio, through resistors R41 and R42. Resistor R41 presents the $+5$ volt signal as described before. Resistor R42 presents to the integrated circuit IC3A the signal representing the difference between the desired amplitude level and the actual amplitude level.

Capacitor C41, shown in FIG. 3B connected in series with the output of amplifier IC3A and the input of amplifier IC2A, provides a stabilizing feedback from IC3A to IC2A to inhibit oscillation of the error amplifier.

So now the function of integrated circuit IC3A can be seen to be two-fold. It is, as previously stated, an inverting amplifier 14A but it is also a summing amplifier 14B; it sums the required reference signal as set by the operator and the error correct signal as transmitted by the previous section. This error-correct signal is the master logic signal that drives the power amplifier 14D of the control logic means 14. This master logic signal is responsible for correct regulator operation of the power control means 11.

Summarizing the above-described operation, transistors Q1, Q2, Q3 and Q4 form a complementary inverting amplifier 14C-D which is fed by IC3, a simple inverting summing amplifier 14A-B. This complex hybrid section 14C-D in conjunction with amplifier IC3A, forms a non-inverting amplifier with a gain of +4.5 to drive the power control means 11 (the module 11A and the auxiliary SCR 11B). This three-stage amplifier combination described above sums the two important applied signals. The first signal is applied to the input of this amplifier (IC3A) from the control potentiometer 16 or more specifically the customer-set amplitude level adjust potentiometer 16A directly through resistor R30 and R41. The second signal comes from the transducer means 15 and is shaped and amplified by integrated circuits IC1A and IC1B. This two-stage amplifier/shaper also drives the amplitude meter circuit having meter M2. The amplified signal from the transducer means 15 is compared to an equal but opposite signal from the level shifter 16C. The resultant signal is then applied to the error detector and amplifier 14A having difference-summing amplifier IC2A. The signal from this reference-comparing section is applied to modify the primary input from the control potentiometer at the inverter summing amplifier 14A-B.

In operation some level of signal is set by the amplitude level adjust potentiometer 16a and fed through the three-stage complex amplifier network of the control logic means 14 to the power control means 11 setting an output amplitude level for the coil load 12. If the amplitude level is as required, no signal modification occurs in the summing amplifier 14B of control logic means 14. If, however, the transducer 15 indicates that the amplitude level is not at the operator prescribed value, the signal generated by positive peak detector 15C and the wave form shaper 15B of the transducer means 15 will have a lower absolute value than the signal generated by shift level 16C. This slightly-lower-than-required signal from transducer means 15 will result in a net difference in the two signals being a slightly negative voltage. Amplifier IC2A, an inverting amplifier, inverts and amplifies this slightly negative signal. An inverted and amplified signal from the amplifier IC2A (now a positive value) will be applied to amplifier IC3A. This additional positive value adds to the signal as supplied by the operator set amplitude level adjust potentiometer 16A. This signal, as increased by the positive applied signal, will be amplified by the non-inverting complex amplifier consisting of amplifiers 14A-B and 14C-D and appear as an even greater value at the filter capacitor C23. This increased value will then be applied to the power control means 11, resulting in a higher output voltage or higher amplitude level. This higher output voltage, due to the shifted phase angle of the firing voltage on the SCR 22, produces a greater amplitude at the feeder load 12. Thus, the system has compensated and returned the feeder amplitude to its prescribed value.

As a further explanation of how the control signal, consisting of a variable D.C. bias voltage, is able to vary the voltage output of the control regulator 22, reference should be made to FIG. 4. As already explained, the triggering of the SCR 22 is controlled by purely a gating signal which is a phase shift voltage superpositioned by the control signal, a variable D.C. bias voltage. As can be seen from FIGS. 2 and 3, the power control means 11 can optionally include a second SCR, auxiliary SCR 11B. When the first SCR 22 is triggered conductive, it, in turn, triggers the SCR 11B conductive. Otherwise, the operation of the power control means 11 is as described above. Generally, the second SCR is connected in the circuit to handle greater output currents or voltage levels.

Various other components, such as transient suppressor MOV's and RC networks are provided in the power control means 11 for circuit transient protection. MOV's are voltage dependent symmetrical resistors that provide a means of absorbing transient energy pulses while limiting the rise of a transient voltage in the particular circuit.

The specific characteristics of each of the following element of the present invention per se forms no part of the present invention and are not deemed necessary for a full disclosure of the invention. However, without any intent to limit the invention to the same, the preferred values of the elements of the present invention are given below.

| ITEM | DESCRIPTION |
|---|---|
| Transformer T1 | 120 V/40 VAC C.T. at .1A |
| Diode Bridge 13B | 50 V at ½ A |
| Capacitor C1 | 100 mfd/50 V (elect.) |
| Capacitor C2 | .01 mfd/25 V |
| Capacitor C3 | 2200 pf/ 25 V (silver) |
| Capacitor C4 | 100 mfd/25 V (elect.) |
| Capacitor C5 | .1 mfd/25 V |
| Capacitor C11 | 100 mfd/50 V (elect.) |
| Capacitor C12 | .01 mfd/25 V |
| Capacitor C13 | 2200 pf/25 V (silver) |
| Capacitor C14 | 100 mfd/25 V (elect.) |
| Capacitor C15 | .1 mfd/25 V |
| Capacitor C41 | 50 mfd/25 V |
| Capacitor C42 | 15 Mfd/50 V |
| Transistor Q1 | 2N2923 (NPN - signal) |
| Transistor Q2 | 2N3905 (PNP - power) |
| Transistor Q3 | D43C6 (PNP - signal) |
| Transistor Q4 | D425 (NPN - Power) |
| Integrated Circuit IC1 | LM747 (op-amp) |
| Integrated Circuit IC2 | LM747 (op-amp) |
| Integrated Circuit IC3 | LM747 (op-amp) |
| Integrated Circuit IC4 | MC1468 (power supply) |
| Diode D1 | 100 V at 1 A |
| Diode D2 | 100 V at 1 A |
| Diode D3 | 100 V at 1 A |
| Diode D4 | 100 V at 1 A |
| Diode D5 | 100 V at 1 A |
| Diode D6 | 100 V at 1 A |
| Potentiometer P1 | 10 K at 2 W |
| Potentiometer P2 | 10 K at 2 W |
| Potentiometer P3 | 10 K at ½ W |
| Potentiometer P4 | 10 K at ½ W |
| Potentiometer P5 | 20 K at ½ W |
| Potentiometer P 6 | 10 K at ½ W |
| Meter M1 | 0–1 milliamps |
| Meter M2 | 0–100 microamps |
| Switch S1 | DPST 125 at 10 A |
| Pilot Light IL1 | 125 V at 7 W |
| Fuse F1 | 15 A |
| Fuse F2 | ½ A |
| Fuse F3 | 1 A |
| Resistor R1 | 10 K, 1/4 W |
| Resistor R2 | 10 ohm, ½ W |
| Resistor R3 | 1 K, ½ W |
| Resistor R4 | 470 ohm, ½ W |
| Resistor R11 | 10 K, ½ W |
| Resistor R12 | 10 ohm, ½ W |
| Resistor R13 | 1 K, ½ W |
| Resistor R 14 | 470 ohm, ½ W |
| Resistor R21 | 10 K, ½ W |
| Resistor R22 | 10 K, ½ W |
| Resistor R23 | 1 K, ½ W |
| Resistor R24 | 1 K, ½ W |

-continued

| ITEM | DESCRIPTION |
| --- | --- |
| Resistor R25 | 15 K, ¼ W |
| Resistor R30 | 10 K, ¼ W |
| Resistor R31 | 22 K, ¼ W |
| Resistor R32 | 10 K, ¼ W |
| Resistor R33 | 10 K, ¼ W |
| Resistor R34 | 15 K, ¼ W |
| Resistor R35 | 2.2 K, ¼ W |
| Resistor R41 | 22, K, ¼ W |
| Resistor R42 | 22 K, ¼ W |
| Resistor R43 | 22 K, ¼ W |
| Resistor R44 | 4.7 K, ¼ W |
| Resistor R45 | 4.7 K, ¼ W |
| Resistor R46 | 15 K, ¼ W |
| Resistor R47 | 10 K, ¼ W |
| Resistor R48 | 3.9 K, ¼ W |
| Resistor R49 | 22 K, ¼ W |
| Resistor R51 | 4.7 K, ¼ W |
| Resistor R52 | 22 K, ¼ W |
| Resistor R53 | 4.7 K, ¼ W |
| Resistor R 54 | 1 K, ¼ W |
| Resistor R61 | 4.7 K, ¼ W |
| Resistor R62 | 22 K, ¼ W |
| Resistor R63 | 4.7 K, ¼ W |
| Resistor R 64 | 1 K, ¼ W |
| Resistor R 71 | 10 ohm ¼ W |
| Resistor R 72 | 100 K, ¼ W |
| Resistor R73 | 220 K, ¼ W |
| Resistor R74 | 220 K, ¼ W |
| Resistor R75 | 220 K, ¼ W |
| Resistor R76 | 100 K, ¼ W |
| Resistor R81 | 2.2 K, ¼ W |
| Resistor R82 | 2.2 K, ¼ W |
| Resistor R83 | 22 K, ¼ W |
| Resistor R91 | 47 K, ¼ W |
| Resistor R92 | 3 K, ¼ W |
| Resistor R93 | 4.7 K, ¼ W |
| Resistor R94 | 33 K, ¼ W |

Although particular embodiments of the invention have been shown and described in full here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

What is claimed is:

1. In combination, a vibrating apparatus including solenoid means for inducing a vibration mode to the vibratory apparatus and a constant amplitude controller for supplying voltage from an A.C. source to the solenoid means to operate the same to induce the vibration mode of a desired amplitude to the vibratory apparatus, said constant amplitude controller comprising:

power control means for regulating the voltage to said solenoid means in response to a control signal;

said power control means having two power terminals and a control signal receiving terminal, said power terminals being connected in series between said A-C source and said solenoid means, transducer means mechanically coupled to said vibratory apparatus for providing a transducer signal representatively proportioned to reflect the actual amplitude of said vibratory apparatus, operator input means for transulating the desired amplitude of said vibratory apparatus to a reference signal, control logic means including error detector means and a summing means, said error detector means electrically connected to the output of said operator input means for receiving said reference signal and to the output of said transducer means for receiving said transducer signal, said error detector means operative to provide an error-correct signal varying with the difference between said reference signal and said transducer signal, said summing amplifier electrically coupled to the output of said operator input means to receive said reference signal and electrically coupled to said error detector means for receiving said error-correct signal, said summing amplifier operative to sum said reference signal and said error-correct signal to produce as an output said control signal, said power control means electrically coupled to said control logic means for receiving said control signal, power supply means for providing D.C. voltage to power said control logic means, whereby a feedback control system for said vibratory apparatus provides regulation to adjust the actual amplitude level to the desired amplitude level.

2. The combination of claim 1;

said power control means comprising a controlled rectifier and said control signal receiving terminal comprising a gating terminal for said controlled rectifier, means for supplying an A.C. voltage which is phase shifted with respect to the voltage across said controlled rectifier to said gating terminal, said control signal comprising a variable D.C. bias voltage, said power control means adapted to superposition said A.C. phase shifted voltage by said variable D.C. bias voltage to produce a gating signal which fires said controlled rectifier and regulates the voltage to said solenoid means, whereby said control signal from said logic control is capable of shifting the angle of said A.C. phase shifted voltage to produce a different output voltage of said controlled rectifier so that for the vibratory apparatus the actual amplitude equals the desired amplitude.

3. The combination of claim 2, said reference signal of said operator input means having a polarity opposite to that of said transducer signal, said error detector means comprising a summing amplifier, whereby said transducer and reference signals, one negative and one positive, are summed on a 1 to 1 ratio and the resulting non-canceled difference between the same is amplified.

4. The combination of claim 3, a differential gain adjust potentiometer for adjusting the gain of said summing amplifier, whereby the operator can adjust the magnitude and therefore the impact of the resulting non-canceled difference between said transducer and reference signals.

5. The combination of claim 4, said operator input means comprising a control potentiometer means for inputting said desired amplitude level.

6. The combination of claim 5, said control potentiometer means comprising amplitude level adjustment potentiometer for operator input of desired amplitude, said control potentiometer means further comprising a level shifter electrically coupled to the output of said amplitude level adjustment potentiometer, said level shifter operative to adjust the voltage level of said reference signal received from said amplitude

15 level adjust potentiometer to produce an adjusted reference signal, whereby said adjusted reference signal may be adjusted by the operator to have a magnitude range equal to that of said transducer signal but an opposite polarity relative to the same.

7. The combination of claim 1, said control logic means further comprising a voltage inverter and a complex hybrid amplifier being electrically coupled to the output of said summing means for amplifying said control signal from said summing means, whereby the impact of said control signal on said power control means may be greatly amplified.

8. The combination of claim 7, said complex hybrid amplifier comprising a high voltage amplifier and an inverting amplifier, whereby the high voltage amplifier provides a substantial amplification of the signal from the summing means and the inverting amplifier in effect cancels the reversing of polarities caused by said voltage inverter.

9. The combination of claim 8, said complex hybrid amplifier having positive and negative amplifier portions for amplifying positive and negative signals respectively.

10. The combination of claim 6, said control logic means further comprising a voltage inverter and a complex hybrid amplifier being electrically coupled to the output of said summing means for amplifying said control signal from said summing means, whereby the impact of said control signal on said power control means may be greatly amplified.

11. The combination of claim 10, said complex hybrid amplifier comprising a high voltage amplifier and an inverting amplifier, whereby the high voltage amplifier provides a substantial amplification of the signal from the summing means and the inverting amplifier in effect cancels the reversing of polarities caused by said voltage inverter.

12. The combination of claim 11, said complex hybrid amplifier having positive and negative amplifier portions for amplifying positive and negative signals respectively.

13. The combination of claim 1, said transducer means comprises, electrically coupled in series, a transducer for generating an A.C. signal, wave form shaper for conditioning the A.C. signal from the transducer, positive peak detector for reducing the A.C. conditioned signal from said wave form shaper to the peak value of the positive half of the A.C. signal, an amplifier for amplifying the positive peak value from said positive peak detector to generate said transducer signal.

14. The combination of claim 12, said transducer means comprises, electrically coupled in series, a transducer for generating an A.C. signal, wave form shaper for conditioning the A.C. signal from the transducer, positive peak detector for reducing the A.C. conditioned signal from said wave form shaper to the peak value of the positive half of the A.C. signal, an amplifier for amplifying the positive peak value from said positive peak detector to generate said transducer signal.

15. A combination of claim 1,

16 said phase shifted voltage derived from said A.C. source.

16. A combination of claim 2, said variable bias D.C. voltage of said power supply means derived from said A.C. source.

17. A combination of claim 16, said power supply means comprising, electrically coupled in series, a transformer having an input electrically connected to said A.C. source, a rectifier and filter combination for generating an unregulated D.C. voltage from an A.C. voltage, a regulator and second filter combination for providing a regulated D.C. voltage, and a voltage divider regulator for providing a lower regulated D.C. voltage relative to said regulated D.C. voltage of said regulator and second filter combination.

18. A combination of claim 6, said level shifter having a negative said adjusted reference signal, said transducer means having a positive transducer signal, said summing amplifier of said error detector means being an inverter amplifier.

19. The combination of claim 1, said control logic means further comprising means for inhibiting the oscillation of said error detector means.

20. The combination of claim 19, said means for inhibiting the oscillation of said error detector means comprising a capacitive coupling of the output of said summing means and the input of said error detector means.

21. The combination of claim 7, said complex hybrid amplifier further comprising means for smoothing changes in its output voltage.

22. The combination of claim 21, said smoothing means comprising means providing an integrating feedback and a time constant to produce a ramp-like change in said output voltage.

23. The combination of claim 21, said means further comprising a non-polarized capacitance connected between the output of said summing amplifier and the input of said complex hybrid amplifier.

24. The combination of claim 23, said control logic means further comprising means for inhibiting the oscillation of said error detector means.

25. The combination of claim 24, said means for inhibiting the oscillation of said error detector means comprising a capacitive coupling of the output of said summing means and the input of said error detector means.

26. A method of controlling the vibration amplitude so that it remains essentially constant in a vibrating apparatus which includes a solenoid means for inducing a vibration mode to said vibrating apparatus, comprising the steps of:

providing a power control means for regulating a voltage to said solenoid means in response to a control signal, said power control means having two power terminals and a control signal receiving terminal, said power terminals being connected in series between an A.C. source and said solenoid means;

providing a transducer means mechanically coupled to said vibratory apparatus for providing a transducer signal representatively proportioned to reflect the actual amplitude of said vibratory apparatus;

providing an operator input means for translating the desired amplitude of said vibratory apparatus to a reference signal;

providing a control logic means including error detector means and a summing means, said error detector means electrically connected to the output of said operator input means for receiving said reference signal and to the output of said transducer means for receiving said transducer signal, said error detector means operative to provide an error-correct signal varying with the difference between said reference signal and said transducer signal, said summing amplifier electrically coupled to the output of said operator input means to receive said reference signal and electrically coupled to said error detector means for receiving said error-correct signal, said summing amplifier operative to sum said reference signal and said error-correct signal to produce as an output said control signal, said power control means electrically coupled to said control logic means for receiving said control signal;

providing a power supply means for providing D.C. voltage to power said control logic means, whereby a feedback control system for said vibratory apparatus provides a regulation to adjust the actual amplitude level to the desired amplitude level.

27. The method of claim 26, comprising the further step and wherein said power control means comprising a controlled rectifier and said control signal receiving terminal comprising a gating terminal for said controlled rectifier, providing a means for supplying an A.C. voltage which is phase-shifted with respect to the voltage across said controlled rectifier to said gating terminal, said control signal comprising a variable D.C. bias voltage, said power control means adapted to superposition of said A.C. phase-shifted voltage by said variable D.C. bias voltage to produce a gating signal which fires said controlled rectifier and regulates the voltage to said solenoid means, whereby said control signal from said logic control is capable of shifting the angle of said A.C. phase-shifted voltage to produce a different output voltage of said controlled rectifier so that for the vibratory apparatus the actual amplitude equals the desired amplitude.

28. The method of claim 27, comprising the further steps and wherein said reference signal of said operator input means has a polarity opposite to that of said transducer signal, said error detector means comprising a summing amplifier, whereby said transducer and reference signals, one negative and one positive, are summed on a one-to-one ratio and the resulting non-cancelled difference between the same is amplified, providing a differential gain adjust potentiometer for adjusting the gain of said summing amplifier, whereby the operator can ajust the magnitude and therefore the impact of the resulting non-cancelled difference between said transducer and reference signals, said operator input means comprising a control potentiometer means for inputting said amplitude level, said control potentiometer means comprising amplitude level adjustment potentiometer for operator input of the desired amplitude, said control potentiometer means further comprising a level shifter electrically coupled to the output of said amplitude level adjustment potentiometer, said level shifter operative to adjust the voltage level of said reference signal received from said amplitude level adjust potentiometer to produce an adjusted reference signal, whereby said adjusted reference signal may be adjusted by the operator to have a magnitude range equal to that of said transducer signal but an opposite polarity relative to the same.

29. The method of claim 28, comprising the further steps and wherein said control logic means further comprising a voltage inverter and a complex hybrid amplifier being electrically coupled to the output of said summing means for amplifying said control signal from said summing means, whereby the impact of said control signal on said power control means may be greatly amplified, said complex hybrid amplifier comprising a high voltage amplifier and an inverting amplifier, whereby the high voltage amplifier provides a substantial amplification of the signal from the summing means and the inverting amplifier in effect cancel the reversing of polarities caused by said voltage inverter, said complex hybrid amplifier having positive and negative amplifier portions for amplifying positive and negative signals respectively, said transducer means comprising, electrically coupled in series, a transducer for generating an A.C. signal, waveform shaper for conditioning the A.C. signal from the transducer, positive peak detector for reducing the A.C. conditioned signal from said waveform shaper to the peak value of the positive half of the A.C. signal, an amplifier for amplifying the positive peak value from said positive peak detector to generate said transducer signal.

30. The method of claim 27, comprising the further steps and wherein said control logic means further comprising a voltage inverter and a complex hybrid amplifier being electrically coupled to the output of said summing means for amplifying said control signal from said summing means, whereby the impact of said control signal on said power control means may be greatly amplified, said complex hybrid amplifier further comprising means for smoothing changes in its output voltage, said smoothing means comprising means providing an integrated feedback and a time constant to produce a ramp-like change in said output voltage, and said smoothing means further comprising a non-polarized capacitance connected between the output of said summing amplifier and the output of said complex hybrid amplifier.

31. The method of claim 27, wherein said control logic means further comprising means for inhibiting the oscillation of said error detector means, and said means for inhibiting the oscillation of said error detecting means comprising a capacitive coupling of the output of said summing means and the input of said error detector means.

32. The method of claim 27, comprising the further steps and wherein said control logic means further comprising a voltage interior and a complex hybrid amplifier being electrically coupled to the output of said summing means for amplifying said control signal from said summing means, whereby the impact of said control signal on said power control means may be greatly amplified, said complex hybrid amplifier further comprising means for smoothing changes in its output voltage, said smoothing means comprising means providing an integrated feedback and a time constant to product a ramp-like change in said output voltage, and said smoothing means further comprising a non-polarized capacitance connected between the ouput of said summing amplifier and the output of said complex hybrid amplifier, said control logic means further comprising means for inhibiting the oscillation of said error detector means, and said means for inhibiting the oscillation of said error detecting means comprising a capacitive coupling of the output of said summing means and the input of said error detector means.

* * * * *